United States Patent [19]

Schulein

[11] 4,180,229

[45] Dec. 25, 1979

[54] SUCTION-ATTACHABLE KITCHEN APPLIANCE

[75] Inventor: Rolf G. Schülein, Singhofen, Fed. Rep. of Germany

[73] Assignee: Leifheit International Günter Leifheit GmbH, Nassau, Fed. Rep. of Germany

[21] Appl. No.: 840,172

[22] Filed: Oct. 7, 1977

[30] Foreign Application Priority Data

Oct. 7, 1976 [DE] Fed. Rep. of Germany ....... 2645248

[51] Int. Cl.² ........................................... A45D 42/14
[52] U.S. Cl. .................................................. 248/363
[58] Field of Search ................... 248/362, 363, 206 R, 248/346

[56] References Cited

U.S. PATENT DOCUMENTS

| | | | |
|---|---|---|---|
| 2,659,560 | 11/1953 | Lehmann et al. | 248/206 R |
| 2,940,713 | 6/1960 | Van Dusen | 248/206 R |
| 3,152,377 | 10/1964 | Carter et al. | 24/211 R |
| 3,159,370 | 12/1964 | Rubinstein | 248/362 |
| 3,765,638 | 10/1973 | Harrison | 248/363 |
| 4,043,531 | 8/1977 | Green | 248/206 R |

*Primary Examiner*—Lawrence J. Staab
*Attorney, Agent, or Firm*—Michael J. Striker

[57] ABSTRACT

A kitchen appliance, such as a meat grinder, is equipped with a suction plate arranged underneath the bottom of the housing of the appliance. The suction plate is attached to the housing by means of a shaft which is mounted on the lateral walls of the housing of the appliance and can be withdrawn to thereby detach the suction plate from the housing of the appliance. The suction plate has an aperture in a connecting element thereof, and the shaft has an eccentric crank portion which is received in the aperture and lifts it upwardly, together with the central region of the suction plate, when the shaft is pivoted from a rest position to an extended position. When the shaft is pivoted further beyond the extended position, it reaches a releasing position in which the shaft can be withdrawn to dissociate the suction plate from the housing. A bulge on the connecting element, located beyond a dead-center position of the shaft, holds the shaft in its extended position.

17 Claims, 5 Drawing Figures

SUCTION-ATTACHABLE KITCHEN APPLIANCE

BACKGROUND OF THE INVENTION

The present invention relates to a detachable suction attachment in general, and more particularly to a suction attachment to be used in a kitchen appliance, such as a meat grinder.

Kitchen appliances of the above-mentioned type are already known and in widespread use. A kitchen appliance of this type usually includes a housing accommodating tools and similar components of the appliance, and a connecting arrangement which connects the appliance to a working area so that at least a predominant part of the housing is located above a support surface of the working area. In this context, it is already known to equip the housing of the appliance with at least one suction element which constitutes the connecting arrangement and which suctionally detains the housing of the appliance at a selected region of the support surface of the working area. When the kitchen appliance is equipped with such a suction element or a plurality of such suction elements, it can be reliably held on the support surface of the working area or working plate, so long as the latter has a smooth upper surface. As a rule, the conventional appliances are equipped with a plurality of such suction elements. Such suction elements are made of an elastic material and are connected to the housing of the appliance. More often than not, the suction elements or suction cups of the prior art are connected to the housing via an actuating arrangement which is capable of lifting the central region of the respective suction element so that a subatmospheric pressure develops between the suction element and the associated zone of the support surface. However, it is very difficult to detach the suction elements from the housing of the appliance, when it is desired to clean either the suction elements or the bottom of the housing.

SUMMARY OF THE INVENTION

Accordingly, it is a general object of the present invention to avoid the above-discussed disadvantage of the prior art. More particularly, it is an object of the present invention to so construct a kitchen appliance and a suction attachment therefor as to avoid the above-mentioned drawback.

Still another object of the present invention is to design a kitchen appliance, particularly a meat grinder, which it is very simple to attach to and detach from a support surface of a working area.

A concomitant object of the present invention is to develop a kitchen appliance and a suction attachment for the same which are simple in construction, inexpensive to manufacture, and reliable nevertheless.

Yet another object of the invention is to so construct the kitchen appliance and the suction attachment therefor as to be easily disassemblable, for instance, for cleaning purposes.

In pursuance of these objects and others which will become apparent hereafter, one feature of the present invention resides, briefly stated, in a kitchen appliance, particularly a meat grinder, vegetable slicer and the like, which comprises a housing having a bottom; and means for supporting the housing on and attaching the same to a support surface, including a suction plate of an elastically yieldable material and capable of adhering to the support surface; and means for so detachably connected the suction plate to the housing that the connective suction plate is located at the bottom of and thus constitutes a base for the housing. Advantageously, the suction plate has such dimensions as to be juxtaposed with the bottom of the housing in its entirety when connected to the housing. In this manner, the entire base of the housing is constituted by the suction plate of elastically yieldable material and can be easily detached from the housing for cleaning purposes.

According to an advantageous feature of the present invention, the suction plate has a circumferential border region which has a recess therein. Then, the housing has a circumferential projection at the bottom thereof which is received in the recess of the connected suction plate. Because of this simple projection-recess engagement of the housing with the suction plate, the suction plate of elastically yieldable material is held in position at the bottom of the housing in a very simple and easily detachable way.

In a currently preferred embodiment of the present invention, the detachable connecting means includes an upright connecting element affixed to a central region of the suction plate and having an aperture, and a shaft so removably mounted on the housing as to extend substantially parallel to the bottom thereof and through the aperture of the connecting element of the connected suction plate. Thus, once the shaft is removed, the suction plate of an elastically yieldable material can be dissociated from the housing of the appliance.

The removable shaft simultaneously serves the purpose of operating the suction plate. To this end, the shaft is supported on the lateral walls for pivoting about a pivot axis and has an operating portion adapted to deform the elastically yieldable suction plate in response to the pivoting of the shaft, and an actuating portion accessible to the exterior of the housing and operative for pivoting the shaft. Thus, when the actuating portion is actuated, the shaft can be pivoted between a rest position into an extended position in which the suction plate is deformed and suctionally adheres to the support surface, and a releasing position in which the shaft can be withdrawn from the housing.

Advantageously, the connecting element has a shoulder which delimits the aperture of the connecting element from above and the operating portion has a cam surface which is eccentric with respect to the pivot axis of the shaft and contacts the shoulder of the connecting element as the shaft pivots in a range between the rest position and the extended position of the shaft to raise the connecting element and thus deflect the central region of the elastically yieldable suction plate from the support surface. Preferably, the operating portion is a crank portion of the shaft which is offset from the pivot axis and has the above-mentioned cam surface thereon. As a result of this, the suction plate is brought into its operative position by simply pivoting the shaft. The lifting of the central region of the suction plate of the elastically yieldable material is herein obtained as a result of the orbiting motion of the crank portion of the shaft which acts as an eccentric.

In a currently preferred embodiment of the present invention, the connecting element includes a projection which is situated upwardly of the aperture and has a contact surface which constitutes an extension of the shoulder. Advantageously, the projection is an integral part of the connecting element which is bent out of the general plane of the connecting element. Consequently, the upright connecting element may have a relatively small wall thickness inasmuch as the bent projection of the connecting element provides for a sufficiently large area of contact of the connecting element with the eccentric operating portion of the shaft.

The appliance of the present invention is further preferably equipped with means for holding the shaft in the extended position thereof, including at least one bulge on the connecting elements against which the operating portion of the shaft abuts in the extended position of the shaft. Advantageously, the bulge is so arranged at the end of the above-mentioned range that the operating portion of the shaft must pass through a dot-dead-center position before abutting the bulge in the extended position of the shaft. As a result of this, the eccentric operating portion of the shaft is reliably retained in this over-dead-center extended position which corresponds to the operating position of the suction plate. Preferably, the bulge is integral with the projection of the connecting element.

According to a currently preferred aspect of the present invention, the actuating portion of the shaft includes a tubular socket which accommodates an end portion of the shaft, and the respective lateral wall of the housing has an orifice for receiving the tubular socket therein. The orifice has such dimensions as to permit extraction of the operating portion of the shaft therethrough in the releasing position of the shaft. This may be achieved in that the tubular socket has external dimensions exceeding double the radius of orbiting of the farthest point of the eccentric operating portion of the shaft so that even the operating portion of the shaft can pass through the orifice without any hinderance whatsoever.

The appliance of the present invention, in accordance to a further facet of the present invention, comprises means for retaining the shaft in the housing against extraction at least in the extended position of the shaft, which includes a detent projection extending radially outwardly of the tubular socket, and a marginal portion of the lateral wall which bounds the orifice and which has a releasing recess permitting the detent projection of the tubular socket to pass to the exterior of the housing during the intended extraction of the shaft from the housing. Advantageously, the detent projection is in registry with the releasing recess in the above-mentioned releasing position of the shaft. In this manner, the shaft is reliably retained in the housing at least in the range of movement thereof between the rest position and the over-dead-center extended position against any axial shifting thereof. When it is intended to remove the shaft from the housing, it is necessary to pivot the shaft beyond the extended position thereof until the shaft reaches its releasing position in which the detent projection is in registry with the releasing recess. In this releasing position, the shaft can be shifted axially until it is extracted from the housing through the orifice of the lateral side of the housing. Of course, the bulge of the connecting element will have to yield to permit the eccentric portion of the shaft to be pivoted beyond the above-mentioned extended position which corresponds to the operating position of the suction plate. Inasmuch as this yielding of the bulge, which will be accompanied by a further deflection of the central portion of the suction plate, requires additional force, it is assured that the shaft will not be pivoted into its releasing position accidentally.

It is further advantageous, in accordance with the present invention, to form the suction plate with a receiving chamber, and to equip the connecting element with a plate-shaped foot received in the chamber of the suction plate. Advantageously, the plate-shaped foot of the connecting element is embedded in the material of the suction plate. In this manner, the upright connecting element is, in a very simple and reliable manner, connected to the suction plate of a soft elastically yieldable material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
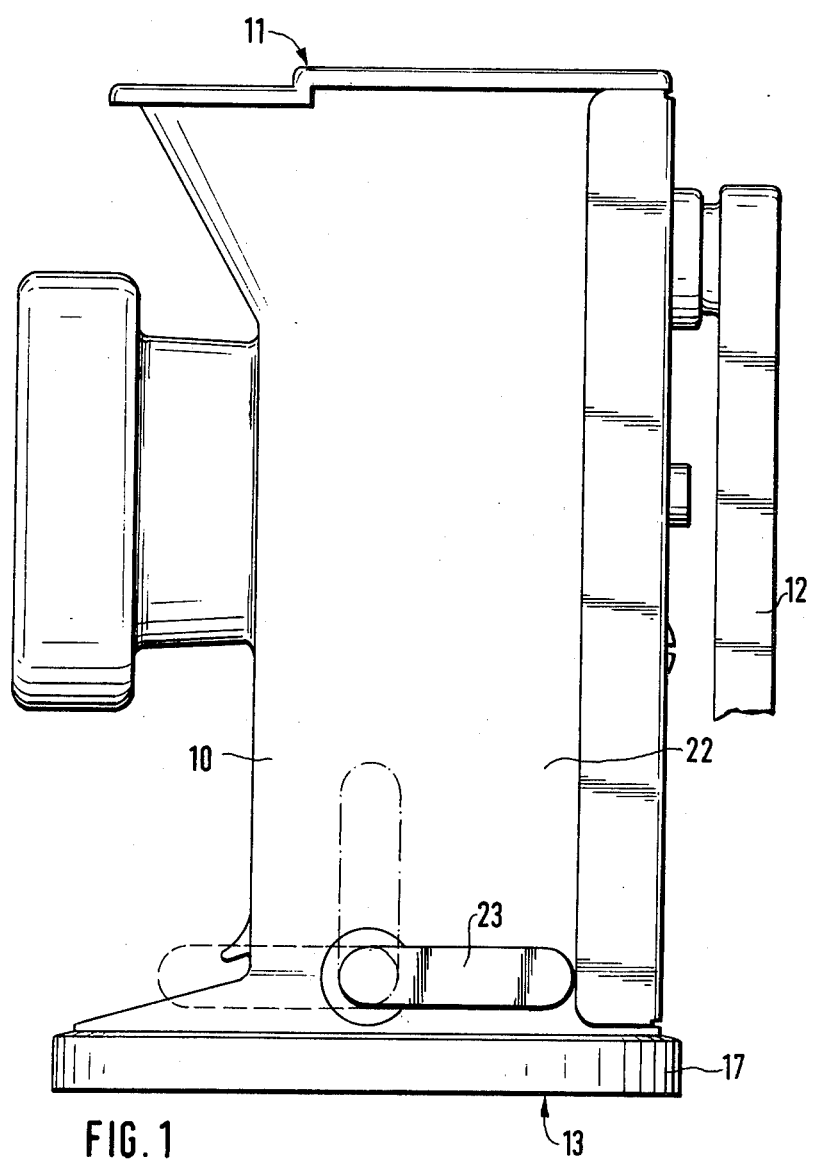
FIG. 1 is a partly sectioned side elevational view of the arrangement of the present invention as embodied in a meat grinder.

Referring now to the drawing in detail, and first to FIG. 1 thereof, it may be seen therein that the present invention is illustrated as being used in connection with a meat grinder which has a housing 10 equipped with a filling opening or hopper 11. A non-illustrated conventional tool is accommodated in the housing 10 underneath the inlet hopper 11 thereof, and a handle 12 rotationally mounted on the housing 10 is used to rotate the non-illustrated tool element. For the sake of simplicity, only a part of the lever portion of the handle 12 is illustrated in the drawing.

For the purpose of supporting the housing 10 on and attaching the same to a non-illustrated support surface of a working area, there is provided a suction element 13 which, according to the present invention, is constituted by a suction plate 14 of a soft elastically yieldable material which extends underneath the bottom of the housing 10 and covers the bottom of the housing 10 in its entirety. In this manner, the suction plate 14 constitutes a base of the housing 10 when connected thereto.

Figure 2:
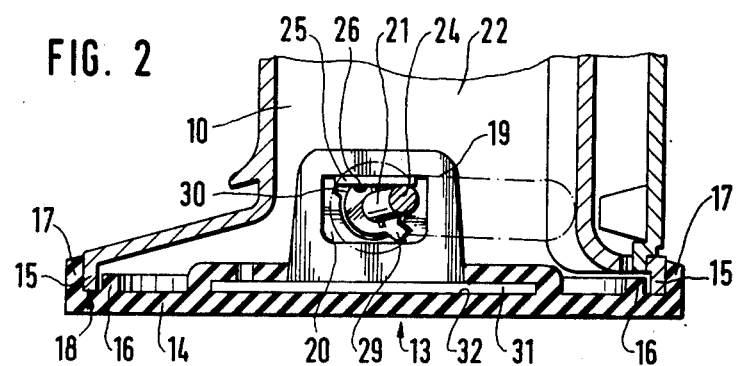
FIG. 2 is a fragmentary view of the bottom part of the lines of FIG. 1 illustrating a rest position of a suction plate.
Figure 3:
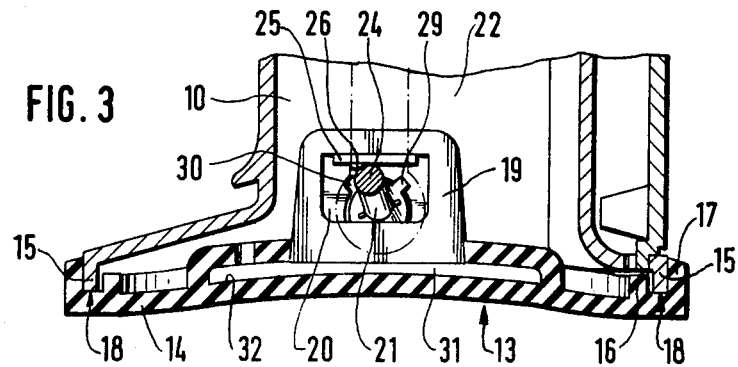
FIG. 3 is a view similar to FIG. 2 but illustrating an extended position.
Figure 4:
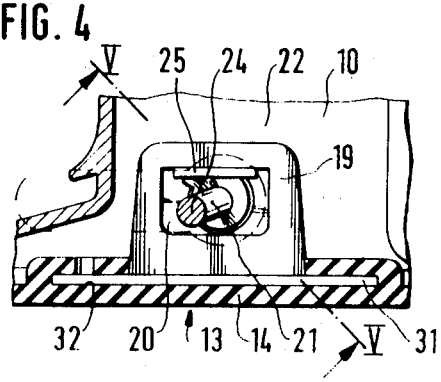
FIG. 4 is a view similar to FIGS. 2 and 3 but illustrating a releasing position.

Referring now particularly to FIGS. 2 to 4, it may be seen therein that the housing 10 has a downwardly oriented circumferentially extending edge 15 which is received in a recess 18 of the plate 14 of elastically yieldable material, which recess 18 is delimited by two upwardly extending ribs of the suction plate 14.

An upright wall-shaped connecting element 19 is affixed to the suction plate 14 of elastically yieldable material in its central region. The connecting element has a rigidity substantially exceeding that of the suction plate 14. The upright wall-shaped connecting element 19 is provided with an aperture 20 which is adapted to receive a horizontally extending removable shaft 21.

Thus, when the shaft 21 is removed, the suction plate of elastically yieldable material can be disconnected from the housing 10 in a very simple manner.

Figure 5:
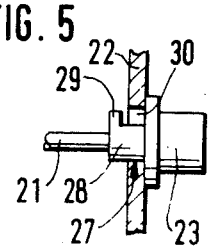
FIG. 5 is a sectional view taken on line V—V of FIG. 4.

The removable shaft 21 simultaneously serves to operate the suction element 13, being pivotally supported at its end in two opposite lateral walls 22 of the housing 10. The shaft 21 has an end portion which extends to the exterior of the housing 10, and an actuator 23 illustrated in FIGS. 1 and 5 is mounted on this end of the shaft 21 for joint rotation therewith. In FIG. 1, the actuator 23 is shown in three different positions. In the position shown in full lines, the suction element 13 assumes its position illustrated in FIG. 2 and the shaft is in its rest position. In this rest position of the shaft, the suction element 13 is inoperative so that the appliance can be lifted from the support surface or shifted thereon.

The position of the actuator 23 which is illustrated in FIG. 1 in dash-dotted lines corresponds to the operative position of the suction element 13 which is illustrated in detail in FIG. 3. As also seen in FIG. 1, the actuator 23 can be pivoted further beyond its extended position until it reaches its releasing position which is illustrated in FIG. 1 in dashed lines. In this position of the actuator 23 in which the shaft 21 assumes its releasing position, the shaft 21 can be withdrawn from the housing 10, thus disconnecting the suction element 13 from the housing 10. This releasing position is shown in detail in FIGS. 4 and 5.

The shaft 21 has an operating portion 24 at its central region, the operating portion 24 being constituted by an offset portion of the shaft 21. The operating portion 24 is received in the aperture 20 of the upright wall-shaped connecting element 19. More particularly, the offset operating portion 24 abuts against the upper edge bounding the aperture 20. As a result of this abutment, the central region of the suction plate 14 of elastically yieldable material can be deflected during the pivoting of the shaft 21 which is accompanied by orbiting of the operating portion 24 of the shaft 21 about the pivot axis of the latter, so that a suction effect is obtained between the lower surface of the suction plate 14 and the juxtaposed area of the support surface on which the housing 10 of the appliance rests. The upper edge or shoulder bounding the aperture 20 of the upright wallshaped connecting element 19 is extended by providing the connecting element 19 with a projection 25 extending in the axial direction of the shaft 21 and contacting the operating portion 24 thereof. Advantageously, the projection is obtained by bending the material of the connecting element 19 out of the general plane of the latter. In this manner, there is obtained a sufficiently wide contact surface for the engagement of the operating portion 24 of the shaft 21 therewith. As may be ascertained from FIG. 2, the operating portion 24 of the shaft 21, when in its rest position, extends substantially horizontally from the shaft 21. In this rest position, the operating portion 24 of the shaft 21 can already, but need not, abut the projection 25. The suction plate 14 of elastically yieldable material has a substantially flat configuration in this rest position of the shaft 21.

In the extended position which is illustrated in FIG. 3, the shaft 21 with the associated actuator 23 has been already pivoted through about 90° from the rest position thereof, as a result of which the operating portion 24 of the shaft 21 has lifted the upright wall-shaped connecting element 19 and thus deflected the central portion of the suction plate of elastically yieldable material upwardly. The border region of the suction plate of elastically yieldably gas-impermeable material is in intimate contact with the support surface on which the appliance is mounted so that a suction effect is obtained by the upward deflection of the central region of the suction plate 14. As also illustrated in FIG. 3, the eccentric operating portion 24 of the shaft 21 assumes an over-dead-center position, so that there is no need to worry about unintended return of the shaft 21 into its rest position. In this extended position, in which the shaft 21 is already beyond the dead-center position thereof, the eccentric operating portion 24 of the shaft 21 abuts against a bulge 26 which is formed on the projection 25 of the upright connecting element 19. Thus, the eccentric operating portion 24 of the shaft 21 is reliably retained in this extended position.

However, when a sufficient force is applied to the actuator 23, it will further pivot the shaft 21 about its pivot axis until the eccentric operating portion 24 of the shaft 21 clears the bulge 26 and finally reaches the releasing position of the shaft 21 which is illustrated in FIG. 4. In this position, the shaft 21 can be removed from the housing 10.

As particularly seen in FIG. 5, the actuator 23 has a tubular socket 28 which accommodates one end of the shaft 21 and by means of which the actuator 23 and thus the shaft 21 are supported in an orifice 27 of the lateral wall 22 of the housing 10. The tubular socket 28 has a larger diameter than the shaft 21 so that the shaft 21 and particularly the eccentric operating portion 24 thereof can be withdrawn from the housing 10 through the orifice 27.

A radially outwardly extending detent projection 29 is provided on the tubular socket 28 of the actuator 23, the detent projection 29 being juxtaposed with the inner surface of the lateral wall 22 of the housing 10. The lateral wall 22 of the housing 10 is provided with a releasing recess 30 which opens into the orifice 27. In the releasing position of the shaft 21 which is illustrated in FIGS. 4 and 5, the detent projection 29 is in registry with the releasing recess 30, thus permitting the withdrawal of the tubular socket 28 and thus of the entire shaft 21 from the housing 10. As a consequence hereof, the shaft 21 can be removed from the housing 10 only when the shaft 21 assumes its releasing position which is illustrated in FIGS. 4 and 5. During the pivoting of the shaft 21 due to the displacement of the actuator 23, between the rest position and the extended position, the radially outwardly extending detent projection 29 of the tubular socket 28 abuts against the inner surface of the lateral wall 22 so that the shaft 21 is prevented from conducting any movement axially thereof.

The upright wall-shaped connecting element 19 has a plate-shaped foot 31 which is received in an internal chamber 32 of the suction plate 14 of elastically yieldable material, particularly being embedded in the elastically yieldable material of the suction plate 14. Thus, the upright wall-shaped connecting element 9 is reliably connected to the suction plate 14.

It will be understood that each of the elements described above, or two or more together, may also find a useful application in other types of constructions differing from the types described above.

While the invention has been illustrated and described as embodied in a meat grinder, it is not intended to be limited to the details shown, since various modifications and structural changes may be made without departing in any way from the spirit of the present invention. So, for instance, the appliance could be of a different type, such as a vegetable slicer or the like.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An appliance, particularly a kitchen appliance, comprising a housing having a bottom; first means for supporting said housing on and attaching the same to a support surface, including a suction plate of an elastically yieldable material and capable of adhering to the support surface; and second means mounted in said housing for actuating said suction plate to thereby attach said housing to said support surface, said second means being displaceable between a first position in which said suction plate is in a first released condition, a second position in which said suction plate is actuated so as to attach said housing to the support surface, and a third position in which said suction plate is in a second released position and in which said second means can be readily withdrawn from said housing.

2. An appliance as defined in claim 1, wherein said suction plate has such dimensions as to be juxtaposed with said bottom of said housing in its entirety when connected to said housing.

3. An appliance as defined in claim 2, wherein said suction plate has a circumferential border region having a recess therein; and wherein said housing has a circumferential projection at said bottom thereof which is received in said recess of said connected suction plate.

4. An appliance as defined in claim 1, wherein said first means includes an upright connecting element affixed to a central region of said suction plate and having an aperture, and a shaft so removably mounted on said housing as to extend substantially parallel to said bottom thereof and through said aperture of said connecting element of said connected suction plate.

5. An appliance as defined in claim 4, wherein said suction plate has a receiving chamber therein; and wherein said connecting element has a plate-shaped foot received in said chamber of said suction plate.

6. An appliance as defined in claim 4, wherein said housing has a pair of lateral walls; and wherein said shaft is supported on said lateral walls for pivoting about a pivot axis and has an operating portion adapted to deform said elastically yieldable suction plate in response to the pivoting of said shaft, and an actuating portion accessible at the exterior of said housing and operative for pivoting said shaft.

7. An appliance as defined in claim 6, wherein said connecting element has a shoulder which delimits said aperture from above; and wherein said operating portion has a cam surface which is eccentric with respect to said pivot axis and contacts said shoulder of said connecting element as said shaft pivots in a range from said first to said second position to raise said connecting element and thus deflect said central region of said elastically yieldable suction plate from the support surface.

8. An appliance as defined in claim 7, wherein said operating portion is a crank portion of said shaft which is offset from said pivot axis and has said cam surface thereon.

9. An appliance as defined in claim 7, wherein said connecting element includes a projection situated upwardly of said aperture and having a contact surface which constitutes an extension of said shoulder.

10. An appliance as defined in claim 9; wherein said second means include at least one bulge on said connecting element against which said operating portion abuts in said second position.

11. An appliance as defined in claim 10, wherein said shaft passes through a dead-center position as it pivots in said range; and wherein said bulge is arranged at the end of said range so that said operating portion of said shaft is to pass through said dead-center position before abutting said bulge in said second position.

12. An appliance as defined in claim 10, wherein said bulge is integral with said projection of said connecting element.

13. An appliance as defined in claim 7, wherein said actuating portion of said shaft includes a tubular socket accommodating an end portion of said shaft; and wherein the respective lateral wall of said housing has an orifice for receiving said tubular socket therein.

14. An appliance as defined in claim 13, wherein said second means include a detent projection extending radially outwardly of said tubular socket, and a marginal portion of said lateral wall which bounds said orifice and which has a releasing recess permitting said detent projection of said tubular socket to pass to the interior of said housing during the intended extraction of said shaft from said housing in said third position.

15. An appliance as defined in claim 14, wherein said shaft is also pivotable in another range beyond said second position and toward said third position; and wherein said detent projection is in registry with said releasing recess in said third position.

16. An appliance as defined in claim 15, wherein said orifice has such dimensions as to permit extraction of said operating portion of said shaft therethrough in said third position.

17. An appliance as defined in claim 1, further comprising third means for so detachably connecting said suction plate to said housing that the connected suction plate is located at said bottom of and thus constitutes a base for said housing.

* * * * *